(12) United States Patent
Moy et al.

(10) Patent No.: US 7,626,239 B2
(45) Date of Patent: Dec. 1, 2009

(54) PROCESS FOR THE COLLECTIVE FABRICATION OF OPTICAL FILTERING COMPONENTS, AND WAFER OF COMPONENTS

(75) Inventors: Jean-Pierre Moy, Saint Egreve (FR); Xavier Hugon, Coublevie (FR)

(73) Assignee: Atmel Grenoble S.A. (FR)

( * ) Notice: Subject to any disclaimer, the term of this patent is extended or adjusted under 35 U.S.C. 154(b) by 486 days.

(21) Appl. No.: 10/514,111

(22) PCT Filed: May 16, 2003

(86) PCT No.: PCT/FR03/01503

§ 371 (c)(1),
(2), (4) Date: Nov. 12, 2004

(87) PCT Pub. No.: WO03/098299

PCT Pub. Date: Nov. 27, 2003

(65) Prior Publication Data

US 2005/0200835 A1      Sep. 15, 2005

(30) Foreign Application Priority Data

May 17, 2002    (FR) .................................. 02 06113

(51) Int. Cl.
*H01L 33/00* (2006.01)
*H01L 31/0216* (2006.01)

(52) U.S. Cl. .................. 257/440; 257/434; 257/436; 257/444; 257/448; 257/E31.001; 257/431; 257/433

(58) Field of Classification Search .................. 438/16, 438/68; 257/433, 434, E31.001
See application file for complete search history.

(56) References Cited

U.S. PATENT DOCUMENTS 4,743,751 A    5/1988    Arques et al.

(Continued)

FOREIGN PATENT DOCUMENTS

FR    00/09634    7/2000

(Continued)

OTHER PUBLICATIONS

Bondavalli, P. et al. "Opto-Mechanical Design of Tuneable InP-Based Fabry-Perot Filter for Gas Analysis", Sensors and Actuators A, Elsevier Sequoia S. A., Lausanne, CH, vol. 94, No. 3, Nov. 20, 2001, pp. 136-141, XP004309206, ISSN: 0924-4247.

(Continued)

*Primary Examiner*—Charles D. Garber
*Assistant Examiner*—Angel Roman
(74) *Attorney, Agent, or Firm*—Lowe Hauptman Ham & Berner, LLP

(57) ABSTRACT

The invention relates to tunable wavelength-selective optical filters for letting light of a narrow optical spectrum band, centered around an adjustable wavelength, to pass through and to stop wavelengths lying outside this band. More particularly, the invention relates to a process for the collective fabrication of optical filtering components, consisting in producing a plurality of optical filtering components on a transparent substrate. The process further comprises covering the plurality of components with a transparent collective cover, in optically testing each component individually, and in separating the various components from one another. The invention also relates to a wafer of components, comprising a transparent substrate on which a plurality of optical filtering components has been produced, a transparent cover (8) collectively covering the components. The wafer further includes means for individually testing each component.

18 Claims, 3 Drawing Sheets

U.S. PATENT DOCUMENTS

| | | | |
|---|---|---|---|
| 5,606,194 A * | 2/1997 | Lebrun et al. | 257/433 |
| 5,798,557 A * | 8/1998 | Salatino et al. | 257/416 |
| 5,973,327 A | 10/1999 | Moy et al. | |
| 6,222,206 B1 | 4/2001 | Chirovsky et al. | |
| 6,275,513 B1 * | 8/2001 | Chang-Hasnain et al. | 372/20 |
| 6,295,130 B1 | 9/2001 | Sun et al. | |
| 6,455,927 B1 * | 9/2002 | Glenn et al. | 257/686 |
| 6,509,560 B1 * | 1/2003 | Glenn et al. | 250/239 |
| 6,512,231 B1 | 1/2003 | Moy | |
| 6,534,340 B1 * | 3/2003 | Karpman et al. | 438/113 |
| 6,583,419 B1 | 6/2003 | Moy et al. | |
| 6,686,588 B1 * | 2/2004 | Webster et al. | 250/239 |
| 6,737,292 B2 * | 5/2004 | Seo | 438/64 |
| 6,842,217 B1 * | 1/2005 | Miller et al. | 349/198 |
| 6,910,812 B2 * | 6/2005 | Pommer et al. | 385/92 |
| 7,045,868 B2 * | 5/2006 | Ding et al. | 257/414 |
| 7,239,001 B2 * | 7/2007 | Pautet et al. | 257/440 |
| 2003/0098912 A1 * | 5/2003 | Hosokai et al. | 348/207.99 |
| 2003/0124762 A1 * | 7/2003 | Hashimoto | 438/67 |

FOREIGN PATENT DOCUMENTS

| | | |
|---|---|---|
| JP | 01-134956 | 5/1989 |
| WO | WO 02/08788 | 1/2002 |

OTHER PUBLICATIONS

Daleiden, J. et al. "Tunable INP/Air Gap Fabry Perot Filter for Wavelength Division Multiplex Fiber Optical Transmission", 1999 11th International Conference on Indium Phosphide and Related Materials, Conference Proceedings, IPRM Davos, May 16-20, 1999, International Conference on Indium Phosphide and Related Materials, New York, NY, IEEE, US, vol. Conf. 11, May 16, 1999, pp. 285-287, XP000931444, ISBN: 0-7803-5563-6.

Spisser, A. et al. "Highly Selective 1.55 Micrometer InP/Airgap Micromachined Fabry-Perot Filter for Optical Communications", in Electronics Lettesr, No. 34(5), pp. 453-454, 1998.

* cited by examiner

PROCESS FOR THE COLLECTIVE FABRICATION OF OPTICAL FILTERING COMPONENTS, AND WAFER OF COMPONENTS

CROSS-REFERENCE TO RELATED APPLICATIONS

The present Application is based on International Application No. PCT/FR03/01503, filed on May 16, 2003, which in turn corresponds to FR 02/06113 filed on May 17, 2002, and priority is hereby claimed under 35 USC §119 based on these applications. Each of these applications are hereby incorporated by reference in their entirety into the present application.

FIELD OF THE INVENTION

The invention relates to tunable wavelength-selective optical filters that make it possible to let light of a narrow optical spectral band, centered around an adjustable wavelength, pass through them and to stop wavelength lying outside this band. The adjustment of the central wavelength of the narrow spectral band is performed by electrical means.

The word "light" is understood in the broad sense and especially includes spectral bands in the infrared, as will be seen below, a main application of the invention being the filtering of light in various fiber-optic telecommunication bands lying between 1.3 and 1.61 microns.

The advantage of these 1.3 to 1.61 micron bands stems from the fact that the current optical fibers, made of glass, have a low attenuation and optical signals can therefore be transmitted over very great distances. The invention will be explained below with regard to this spectral band, it being understood that the invention can be transposed to other bands, should it be felt necessary, using materials tailored to these different bands.

BACKGROUND OF THE INVENTION

In a fiber-optic telecommunications network, a cable comprising several optical fibers can be used to produce several different transmission channels. It is also possible to carry out temporal data multiplexing in order to achieve the same purpose. However, where a further increase in datastream capacity of the network, the current trend is to transmit simultaneously, on the same optical fiber, several light wavelengths modulated independently of each other and each defining a data channel. ITU (International Telecommunications Union) Standard 692 proposes to define adjacent channels of 100 GHz optical spectral bandwidth that are centered on N adjacent normalized optical frequencies, the values of which are 200 terahertz, 199.9 terahertz, 199.8 terahertz, etc., corresponding to N wavelengths of 1.52 microns up to 1.61 microns. In a channel of this bandwidth, light can be modulated at 10 to 40 gigabits per second without too great a risk of interference with the channels of immediately adjacent spectral bands, (using modulation pulses of Gaussian waveform in order to minimize the bandwidth occupied by this modulation). This frequency multiplexing technique is called DWDM (dense wavelength division multiplexing).

In a telecommunications network, the problem is therefore to be able to collect the light corresponding to a given channel without disturbing light in the neighboring channels. For example, at a transmission node of the network, assigned to the transmission and reception of data of channel i, it must be possible for the light to be collected at a central frequency $F_i$ (wavelength $\lambda_i$) without impeding the transmission of the light modulating the central frequencies $F_1$ to $F_N$, although these optical frequencies are very close to one another.

To do this, highly wavelength-selective optical filtering components must be produced that are capable of letting through the central optical frequency $F_i$ and the frequencies lying within a narrow band of less than 50 GHz on either side of this frequency, and of stopping the other bands. At the output of such a filter, only light from channel i is collected and this light can be demodulated in order to collect the useful data.

It has already been proposed to produce filtering components that operate on the principle of Fabry-Pérot interferometers, produced by depositing semiconductor layers that are separated from one another by airgaps of thicknesses calibrated with respect to the wavelength $\lambda_i$ to be selected. In practice, an interferometer comprises two mirrors consisting of superposed dielectric layers (Bragg mirrors) of high reflection coefficient that are separated by a transparent gap of optical thickness $k\lambda_i/2$ (if the gap is an airgap, this is the actual thickness $k\lambda_i/2$) where k is an integer defining the order of the interferometric filter. Indium phosphide (InP) is well suited to such constructions, especially because of its transparency at the wavelengths in question, its very high refractive index and the possibility of depositing epilayers of well-controlled thicknesses.

If the thicknesses of the layers and the gaps between the layers are very well controlled and if the materials have a high refractive index, such a filter proves to be highly selective.

Such a construction is described in the article by A. Spisser et al. "*Highly Selective* 1.55 *micrometer InP/airgap micromachined Fabry-Perot filter for optical communications*" in Electronics Letters, No. 34(5), pages 453-454, 1998. Other constructions have been proposed, in micromachined silicon, and in alloys based on gallium arsenide.

These filters are generally produced on a wafer. More precisely, the filters are produced collectively on a transparent substrate, such as for example indium phosphide. The notion of transparency applies, of course, to the wavelength of the band in question. It is possible to produce several hundred filters on one and the same substrate wafer.

Filters formed by two Bragg mirrors separated by an airgap are extremely fragile. Their thickness does not exceed a few microns and to handle them is consequently very tricky.

The object of the invention is to alleviate this problem by proposing a process for the collective fabrication of optical filtering components which allows easier handling.

SUMMARY OF THE INVENTION

For this purpose, the subject of the invention is a process for the collective fabrication of optical filtering components, consisting in producing, on a transparent substrate a plurality of optical filtering components, characterized in that it further consists in covering the plurality of components with a transparent collective cover, in optically testing each component individually, and in separating the various components from one another.

The subject of the invention is also a wafer of components, comprising a transparent substrate on which a plurality of optical filtering components have been produced, a transparent cover collectively covering the components, means for individually testing each component.

Using a substrate and a transparent cover, it is possible to integrate, either into the cover or into the substrate, and advantageously into both, optical focusing or collimation means for optically tuning the filter directly from optical fibers. Thus, each filter can be optically tested before the components produced on one and the same wafer have been separated. It is thus possible to retain only the components that have successfully undergone the test, and to eliminate the others.

The operation of separating the components may be performed by cutting, for example by sawing, but this operation generates numerous particles that might damage the components. The presence of the cover before components are separated allows the active part of the component, formed by the Bragg mirrors, to be protected.

The invention will be better understood and other advantages will become apparent on reading the detailed description of three embodiments of the invention, this description being illustrated by the appended drawing in which:

DETAILED DESCRIPTION OF PREFERRED EMBODIMENT

Figure 1:
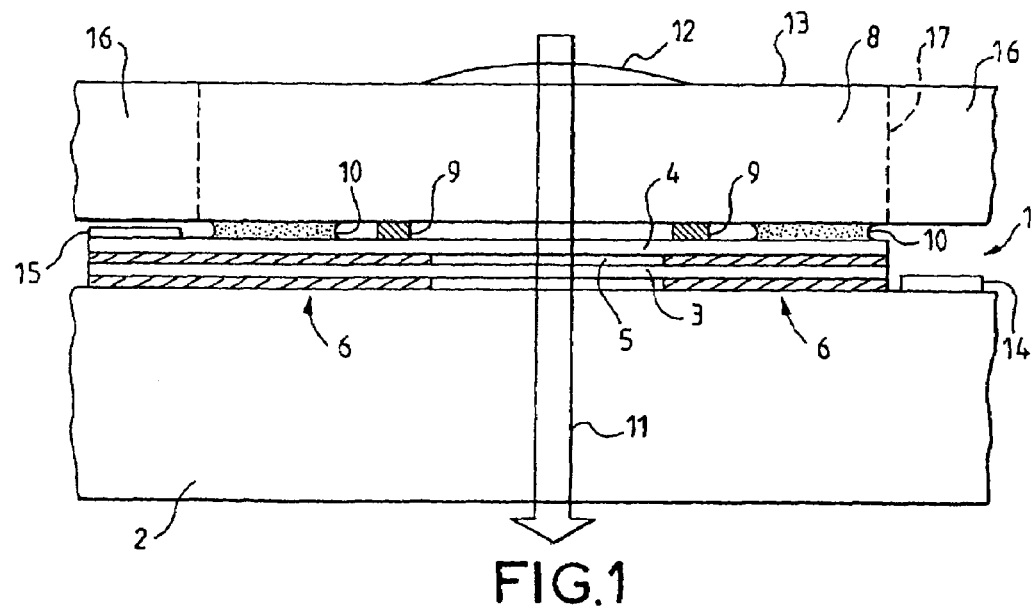
FIG. 1 shows an optical filtering component in cross section according to a first embodiment.
Figure 2:
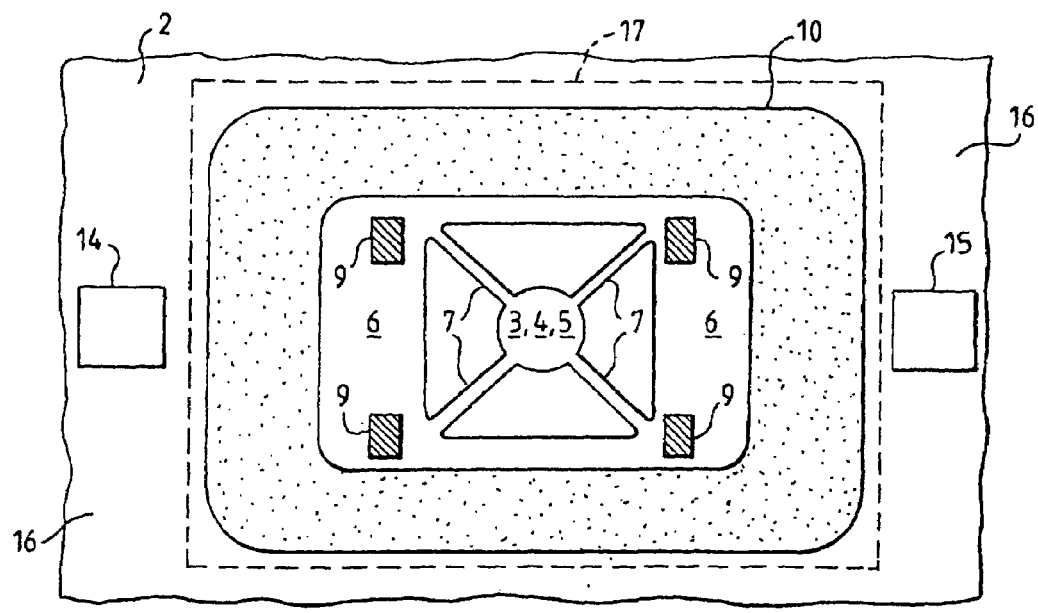
FIG. 2 shows, in a top view, the component shown in FIG. 1.

FIGS. 1 and 2 show an optical filtering component 1 produced on a wafer. It is produced on a substrate 2, only that part of which bearing the component 1 has been shown. In practice, a large number of components are produced on one and the same substrate, these being for example identical and placed side by side on the substrate 2. An active part of the component 1 comprises two Bragg mirrors 3 and 4 separated by an airgap 5. The mirrors 3 and 4 are connected to a bulk part 6 attached to the substrate 2 via arms 7 which are, for example, 4 in number, as shown in FIG. 2. The arms 7 provide the mirrors 3 and 4 with a certain amount of flexibility so as to adjust the thickness of the airgap 5 and, consequently, the central wavelength filtered by the component 1. The active part of the component 1 is surmounted by a transparent cover 8. Spacers 9 keep the cover 8 and the mirror 4 a certain distance apart. The cover 8 is fastened to the bulk part 6 by a bead 10 of resin that surrounds the active part of the component 1. The bead 10 of resin may be replaced with a bead 10 of soft metal, such as indium for example, which can be squashed, or else with a bead 10 made of a soft solder alloy melted by moderately heating the component 1 in its entirety. The path of a light ray passing through the filter is shown symbolically by the arrow 11. This path is perpendicular to the plane of the mirrors 3 and 4. Advantageously, optical processing means 12 are placed on the cover 8, for example allowing a ray entering the filter via the external face 13 of the cover 8 to be focused or collimated.

Advantageously, the component 1 is tuned by varying the thickness of the airgap 5 separating the two mirrors 3 and 4. The mirrors 3 and 4 may be produced by semiconductor layers. The airgap 5, which defines the Fabry-Perot resonant cavity, is bounded by two semiconductor layers facing each other, the spacing of which is defined very precisely during fabrication. By making electrical contact with each of the layers (these being supposed to be sufficiently conductive or coated with a conductive material), it is possible to apply a DC voltage which creates, between the facing layers, electrostatic forces tending to modify this spacing in a controlled manner. By varying the voltage it is possible to modify these electrostatic forces and, consequently, to adjust the tuning of the component 1. The arms 7 provide sufficient stiffness to resist the electrostatic forces and to keep the two layers in a stable position. Electrical contacts 14 and 15 provide the electrical connection between the mirrors 3 and 4 and an external voltage source (not shown).

In the process for fabricating the component 1, several components 1 are firstly produced on the substrate 2. All the components 1 are then covered by the transparent collective cover 8. An optical test is then carried out on each component before their separation. Advantageously, during the optical test of the component 1, a test of its tuning means may be performed. More precisely, an electrical voltage can be applied between the pads 14 and 15 and this voltage varied within a useful range so as to check whether the tuning of the component is being performed under acceptable conditions.

To allow the electrical voltage to be applied between the pads 14 and 15, the component 1 may be cut into beforehand, so as to remove a part 16 from the cover 8 (the part 16 being external to the dotted lines 17). Thus, the pads 14 and 15 become accessible from the outside and the voltage can be applied for example by means of needles, the points of which bear on the pads 14 and 15.

Figure 3:
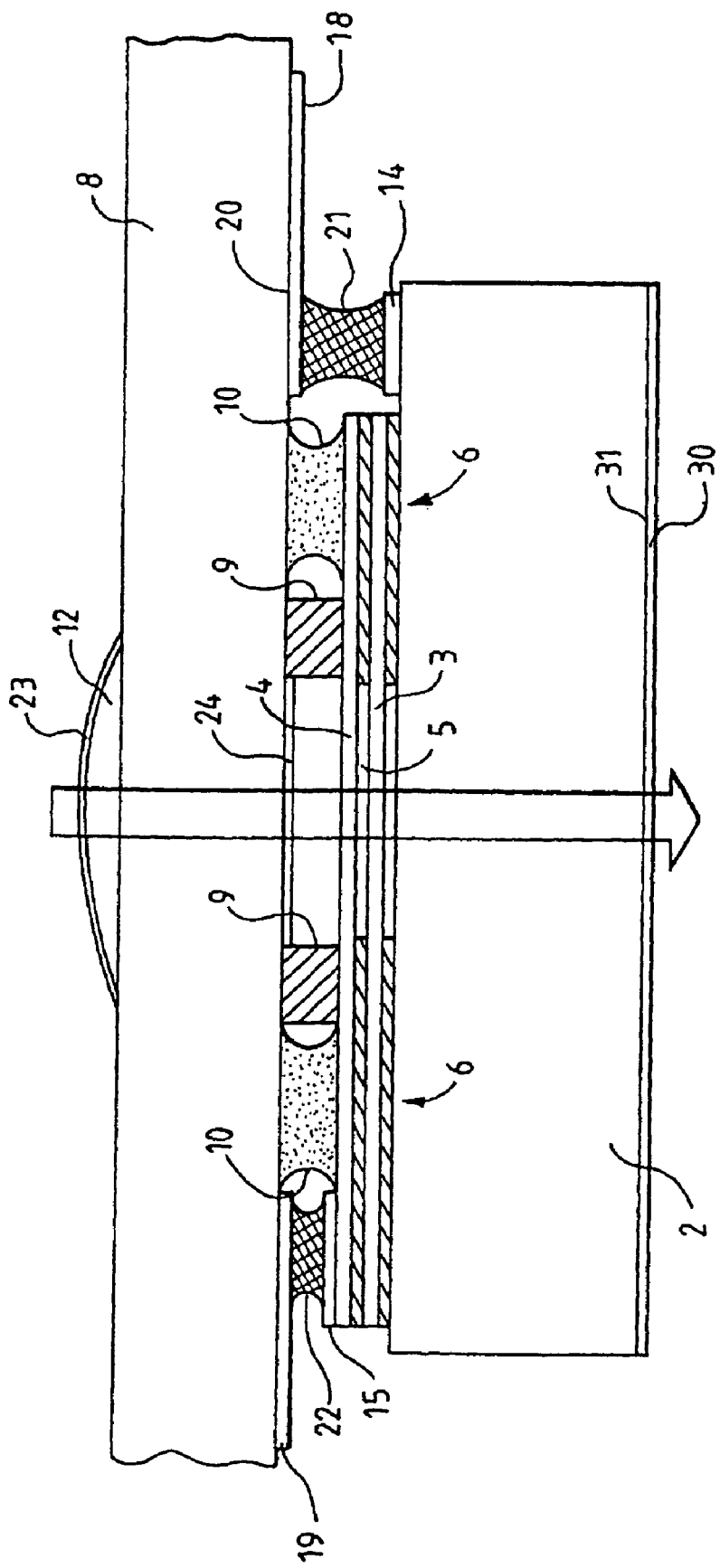
FIG. 3 shows the component according to a second embodiment in cross section.

FIG. 3 shows a second embodiment in which all of the elements described above are again shown. Unlike the embodiment described above, the cover 8 is not cut, rather the substrate 2, in order to apply the voltage to the pads 14 and 15 needed to tune the component 1. To make it easier to apply the voltage through the substrate, the pads 14 and 15 are connected respectively to lands 18 and 19, for example produced by photoetching means on the internal face 20 of the cover 8. The pad 14 is electrically connected to the land 18 via a column 21 made of a conductive material. The same applies to the pad 15, which is connected to the land 18 via a column 22.

FIG. 3 also shows antireflection coatings 23, 24 and 30 advantageously produced along the path of the ray passing through the component 1. The antireflection coating 23 is applied to the optical processing means 12, the antireflection coating 24 is applied to the internal face of the cover 8 and the coating 30 is applied to a face 31 of the substrate 2. The face 31 is opposite that bearing the mirrors 3 and 4. These antireflection coatings may be employed for any of the embodiments of the invention.

Figure 4:
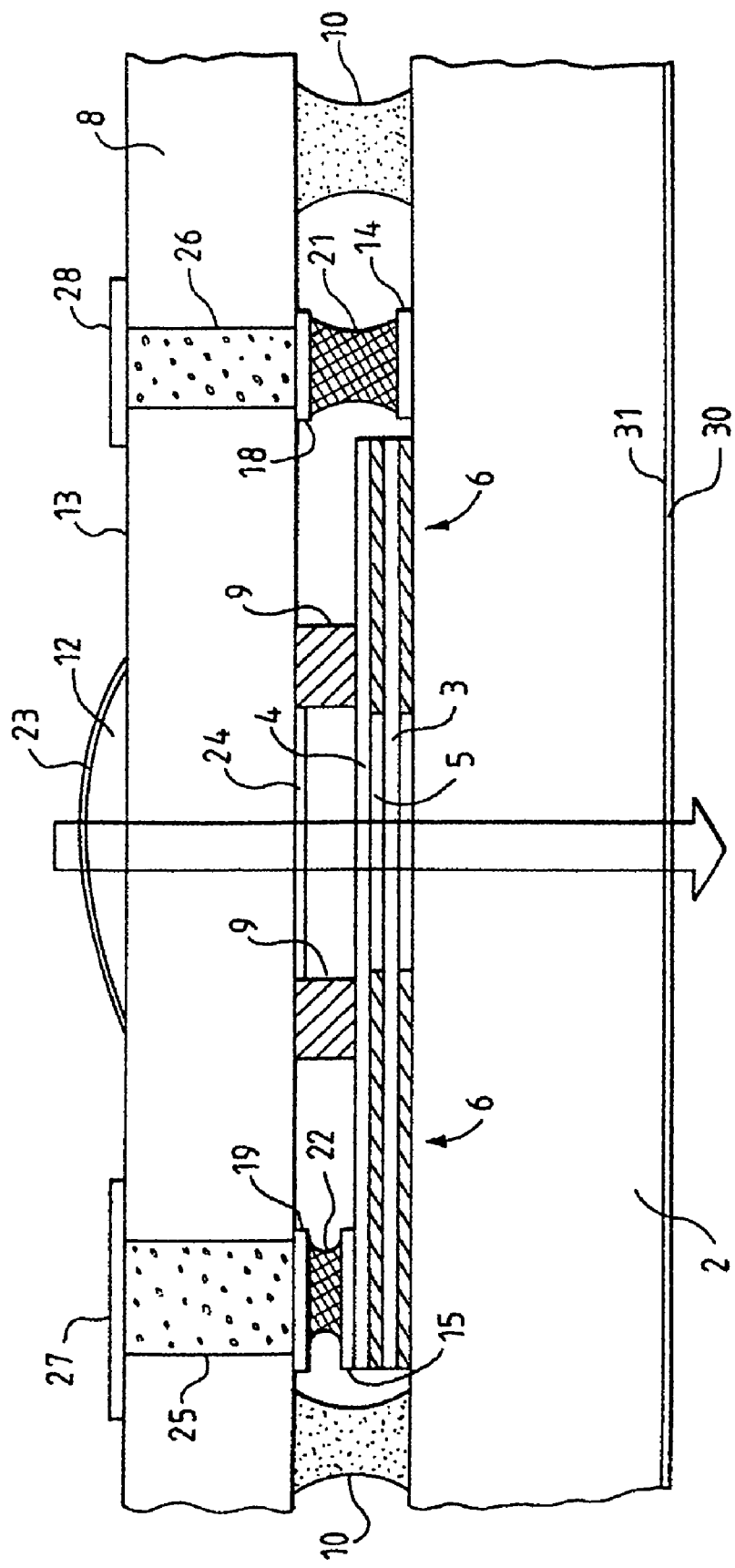
FIG. 4 shows the component according to a third embodiment in cross section.

FIG. 4 shows a third embodiment in which again the elements described in the first embodiment are shown. This time, to apply the voltage to the pads 14 and 15, no cut is necessary. In contrast, vias 25 and 26 are produced in the cover 8 so as to apply the voltage needed to tune the component 1 via the external face 13 of the cover 8. The vias 25 and 26 may be produced by drilling the cover 8 vertically in line with the lands 18 and 19. The drillholes thus produced are then filled with a conductive material such as, for example, a conductive epoxy resin or a metal alloy compatible with the material of the cover 8. Lands 27 and 28 may also be produced on the outer face 13 of the cover 8 facing the respective vias 25 and 26 so as to increase the area of contact for applying the voltage, for example by means of needles.

The optical filtering component 1 is tuned so that the central wavelength that it lets through is centered on one of the wavelengths defined in the ITU 692 standard. However, rejection of the neighboring channels by the filtering component 1 alone may prove to be insufficient. The cover 8 may itself participate with the optical processing means in order to improve this rejection. More precisely, the DWDM frequency multiplexing technique imposes data rates of 40 Gbits per second in channels 100 GHz away. It is therefore necessary to obtain good rejection above 50 GHz on either side of the central wavelength of a channel so as to prevent mixing of the signals.

The form of the response of a filter operating on the principle of Fabry-Pérot interferometers, that is to say a Fabry-Pérot filter, is an Airy function, that is to say the ratio of the mid-height width to the width at 1% of the transmission maximum is independent of the width. This therefore results either in too narrow a filter being produced if rejection is given preference, or to insufficient rejection if preference is given to bandwidth.

In general, the transmission of an interference filter such as a Fabry-Pérot filter may be improved by coupling other resonant cavities to the filter. The transmission curve is no longer an Airy function and it then approaches the perfect bandwidth, that is to say a bandwidth with strong transmission around the central wavelength combined with strong rejection outside the range of interest.

More precisely, it is advantageous to couple the tunable cavity or airgap 5 of the filtering component 1 to another cavity whose thickness is such that the transmission curve of the cavity as a function of wavelength has the shape of a comb, the high-transmission frequencies of which coincide with the frequencies defined in the ITU 692 standard. The optical thickness ne of the cavity is given by:

$$ne = c/2\Delta v$$

where c represents the velocity of light and $\Delta v$ represents the difference between two neighboring frequencies in the ITU 692 standard. This thickness in air would be around 1.5 mm and can be produced by means of a cover made of sapphire with a thickness of 862 μm or made of indium phosphide (InP) with a thickness of 475 μm. Of course, other materials are possible.

It is important to control the electromagnetic coupling between the cover 8 and the component 1. To control this coupling means having to control, with a precision better than one wavelength, the position of the cover 8 relative to the component 1. To achieve this objective, the spacers 9 are produced by means of calibrated balls or fibers. For example, it is possible to use glass balls of extremely precise size, used elsewhere in the production of liquid-crystal screens.

The spacers 9 may also be produced by means of a layer of material etched in the cover 8 or in the substrate 2. For example, this layer may be produced by means of an InGaAs epilayer produced on a substrate 2 or a cover 8 made of InP. This additional layer will be selectively etched in order to produce the spacers 9 at appropriate locations. It is also possible for this additional layer to be made of $SiO_2$, aluminum or gold, which also allows it to fulfill the function provided by the pads 14 and 15.

Advantageously, the wafer of components includes means for adjusting the optical thickness ne of the cover 8. This is because, to achieve good electromagnetic coupling between the cover 8 and the component 1 it is important to control the optical thickness ne of the cover 8. Without these adjustment means, the optical thickness ne of the cover 8 would have to be controlled with a precision of the order of one hundredth of a micron, which seems unrealistic. The optical thickness ne of the cover 8 may be adjusted using means for adjusting its temperature T. More precisely, most materials see their dimensions, especially their thickness e change with temperature T. In addition, transparent materials also see their optical index n change with temperature T. For example, in the case of sapphire:

$$\frac{dn}{dT} = +15 \times 10^{-6} \text{ K}^{-1} \text{ and } \frac{de}{e \cdot dT} = 5 \times 10^{-6} \text{ K}^{-1}.$$

Moreover, it is known that:

$$\frac{dv}{dT} = -v\left(\frac{1}{n}\frac{dn}{dT} + \frac{1}{e}\frac{de}{dT}\right).$$

Applying this formula to sapphire gives:

$$\frac{dv}{dT} = 2.7 \text{ GHz/K}.$$

This numerical example shows that it is possible to tune the optical cavity produced by means of the cover 8 to the expected frequency by stabilizing the temperature of the cover 8 with the precision of a few tenths of a degree. This precision is easily achieved for example with a Peltier-effect module combined with a temperature sensor for controlling the operation of the module. Advantageously, the Peltier-effect module may be replaced with a heating resistor, which can be deposited on the cover itself, if the desired temperature is still above room temperature.

Advantageously, in the embodiment shown in FIG. 4, the bead of resin 10 surrounds the columns 21 and 22 and the active part of the component 1. Thus, the columns 21 and 22 and the active part of the component 1 may be protected from any external attack by enclosing them in an impermeable envelope that can be filled with an inert gas, such as nitrogen for example.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A wafer of components, comprising:
    a transparent substrate having a plurality of optical filtering components formed thereon;
    a transparent cover collectively covering all of the optical filtering components, said cover forming a resonance chamber for each of the optical filtering components; and
    means formed on the wafer for individually testing each optical filtering component when the transparent cover is placed above the components.

2. The wafer as claimed in claim 1, wherein the cover includes optical processing means.

3. The wafer as claimed in claim 1, wherein the testing means include vias that pass through the cover and are connected to the components.

4. The wafer as claimed in claim 1, wherein the transparent cover has, at least around a light path that passes through the components, a constant optical thickness so as to form a cavity tunable with the components.

5. The wafer as claimed in claim 1, further comprising means for positioning the cover relative to the components, wherein precision of the positioning is better than one wavelength filtered by the components.

6. The wafer as claimed in claim 5, wherein the means for positioning the cover comprise calibrated balls.

7. The wafer as claimed in claim 5, wherein it includes means for positioning the cover relative to the substrate, the positioning means having a layer of a material etched in the cover or in the substrate.

8. The wafer as claimed in claim 1, wherein the cover includes means for adjusting its optical thickness.

9. The wafer as claimed in claim 8, wherein the means for adjusting the optical thickness of the cover include means for adjusting the temperature of the cover.

10. The wafer as claimed in claim 2, wherein the testing means include vias that pass through the cover and are connected to the components.

11. The wafer as claimed in claim 2, wherein the transparent cover has, at least around a light path that passes through the components, a constant optical thickness so as to form a cavity tunable with the components.

12. The wafer as claimed in claim 1, wherein the transparent cover has, at least around a light path that passes through the components, a constant optical thickness so as to form a cavity tunable with the component.

13. The wafer as claimed in claim 5, wherein the cover includes means for adjusting its optical thickness.

14. The wafer as claimed in claim 6, wherein the cover includes means for adjusting its optical thickness.

15. The wafer as claimed in claim 7, wherein the cover includes means for adjusting its optical thickness.

16. The wafer as claimed in claim 2, wherein the optical processing means is disposed on the cover.

17. The wafer as claimed in claim 1, wherein the cover is made of sapphire having a thickness of about 862 μm.

18. The wafer as claimed in claim 1, wherein the cover is made of indium phosphide having thickness of about 475 μm.

* * * * *